US012476922B2

(12) United States Patent
Betarayappa et al.

(10) Patent No.: US 12,476,922 B2
(45) Date of Patent: Nov. 18, 2025

(54) METHODS AND SYSTEMS FOR VEHICLE COMMUNICATION

(71) Applicant: Harman International Industries, Incorporated, Stamford, CT (US)

(72) Inventors: Shreekanth Betarayappa, Karnataka (IN); Girish Ramesh Rayas, Karnataka (IN); Arul Raj, Karnataka (IN); Harshawardhan Vipat, San Jose, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 18/569,196

(22) PCT Filed: Sep. 9, 2022

(86) PCT No.: PCT/US2022/076186
§ 371 (c)(1),
(2) Date: Dec. 11, 2023

(87) PCT Pub. No.: WO2023/044269
PCT Pub. Date: Mar. 23, 2023

(65) Prior Publication Data
US 2024/0291769 A1 Aug. 29, 2024

(30) Foreign Application Priority Data

Sep. 17, 2021 (IN) .............................. 202141042138

(51) Int. Cl.
*H04L 47/6295* (2022.01)
*H04L 47/62* (2022.01)
*H04L 47/6275* (2022.01)

(52) U.S. Cl.
CPC ........ *H04L 47/6295* (2013.01); *H04L 47/621* (2013.01); *H04L 47/6225* (2013.01); *H04L 47/6275* (2013.01)

(58) Field of Classification Search
CPC .............. H04L 47/6295; H04L 47/621; H04L 47/6225; H04L 47/6275; H04L 47/6255;
(Continued)

(56) References Cited

U.S. PATENT DOCUMENTS

2014/0006615 A1* 1/2014 Karnik ................ H04L 63/1441
709/225
2016/0134562 A1 5/2016 Yousefi et al.

FOREIGN PATENT DOCUMENTS

CN 109672996 A 4/2019
CN 110198278 A 9/2019

OTHER PUBLICATIONS

ISA European Patent Office, International Search Report and Written Opinion Issued in Application No. PCT/US2022/076186, Dec. 20, 2022, WIPO, 13 pages.

* cited by examiner

Primary Examiner — Philip C Lee
(74) Attorney, Agent, or Firm — McCoy Russell LLP

(57) ABSTRACT

Methods and systems are proposed for a communication network. In one example, a system comprises a wireless communication network comprising a verification logic hardware. The system further comprises a processor of a vehicle communicatively coupled to the verification logic hardware, wherein the processor comprises instructions stored on non-transitory memory thereof that when executed enable the processor to determine a message type of a message, and distribute the message to a first queue of a
(Continued)

verification logic software of the processor or to a second queue of the verification logic hardware.

5 Claims, 3 Drawing Sheets

(58) Field of Classification Search
CPC ..... H04L 67/12; H04L 51/212; H04L 51/226; H04L 51/58; G06F 15/17; H04W 4/40; H04W 4/16; H04W 4/18
See application file for complete search history.

METHODS AND SYSTEMS FOR VEHICLE COMMUNICATION

CROSS-REFERENCE TO RELATED APPLICATIONS

The present application is a U.S. National Phase of International Application No. PCT/US2022/076186, entitled "METHODS AND SYSTEMS FOR VEHICLE COMMUNICATION", and filed on Sep. 9, 2022. International Application No. PCT/US2022/076186 claims priority to Indian Patent Application No. 202141042138, entitled "METHODS AND SYSTEMS FOR VEHICLE COMMUNICATION", and filed on Sep. 17, 2021. The entire contents of the above-listed applications are hereby incorporated by reference for all purposes.

TECHNICAL FIELD

Embodiments of the subject matter disclosed herein relate to vehicle communications, and more specifically, to a software module including a verification logic for verifying a message on a vehicle processor.

DISCUSSION OF ART

Vehicles may use a communication network to communicate with one another or to a central infrastructure. The communication network may increase roadway/powertrain efficiencies along with other benefits. Information may be exchanged using broadcast messages over a wireless medium.

Some networks may verify messages shared between a vehicle and the communication network to develop trust in the received information. A receiver may authenticate a sender's identity and verify an integrity of the message before performing subsequent actions. A public key infrastructure (PKI) scheme based on digital signatures and certificates may verify the message.

Before participating in a cooperative awareness system, such as a vehicle-to-everything (V2X) system, each participant may receive security credentials (e.g., certificates) from a trusted security credential management system (SCMS). The SCMS may function as a certificate authority (CA) in the PKI system.

Once the security credentials are acquired, the sender may compute a digital signature over the message content and broadcasts the message along with its own certificate and signature. The receiver may verify the sender's certificate is approved by a trusted certificate authority (Root CA), and also may verify the signature over the message to ensure that the contents of the message were not altered after it was verified.

In previous examples, a V2X stack may be executed on a local processor of an onboard unit and the verification logic is offloaded to a dedicated hardware such as a verification accelerator or a hardware security module (HSM). The dedicated hardware may be arranged on a roadside unit (RSU), separate from the local processor. The verification process may be compute-intensive and may represent a bottleneck, slowing the transmission of messages and reducing the benefits of the communication network.

BRIEF DESCRIPTION

In one embodiment, the current disclosure provides support for a wireless communication network comprising a verification logic hardware and a processor of a vehicle communicatively coupled to the verification logic hardware, wherein the processor comprises instructions stored on non-transitory memory thereof that when executed enable the processor to determine a message type of a message, and distribute the message to a first queue of a verification logic software of the processor or to a second queue of the verification logic hardware.

DETAILED DESCRIPTION

Figure 1:
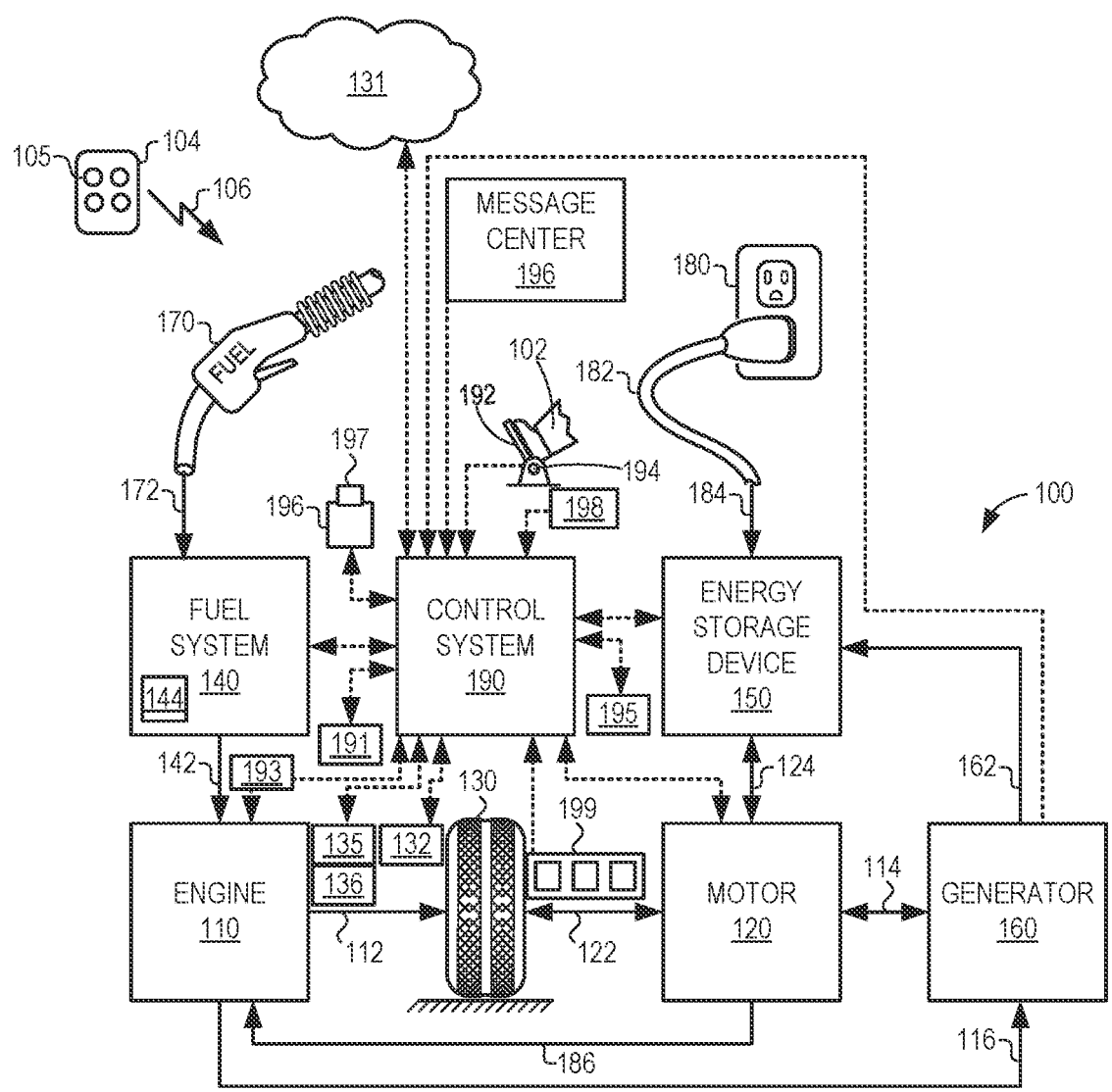
FIG. 1 schematically shows an example vehicle propulsion system.
Figure 2:
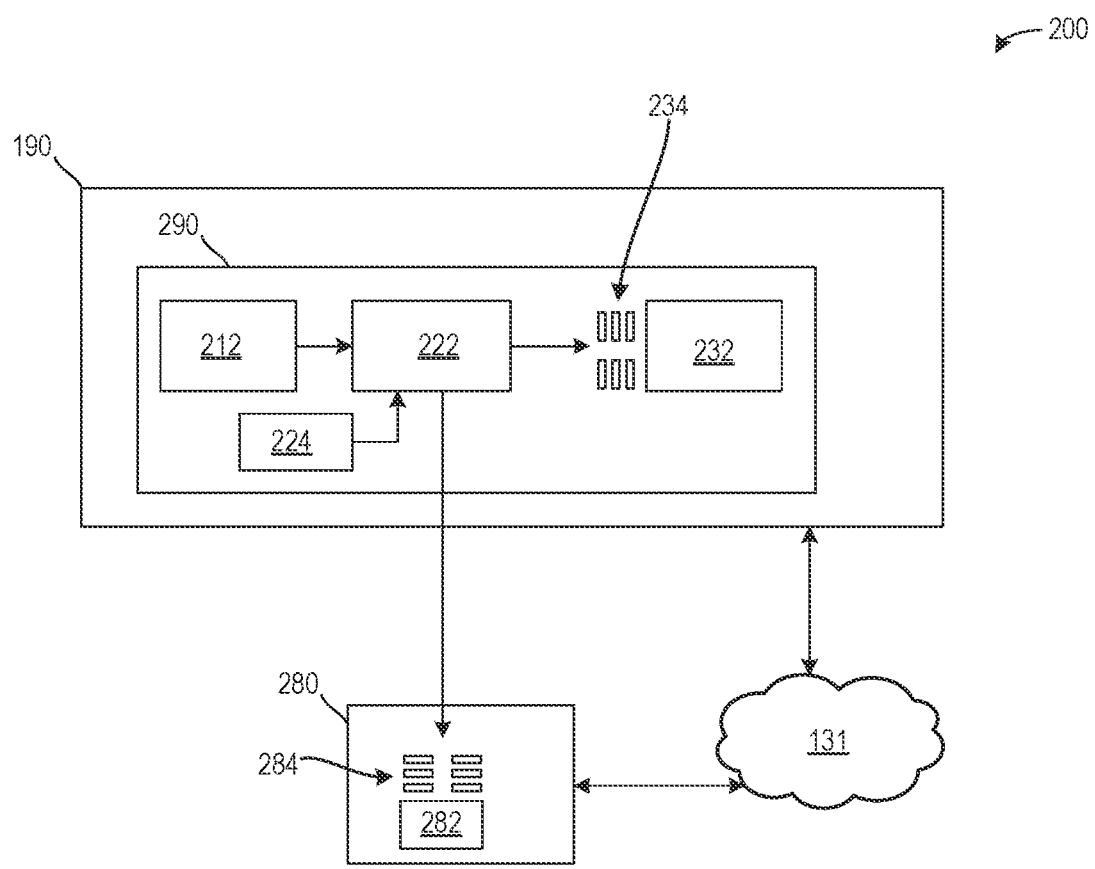
FIG. 2 schematically shows a V2X communication network.

This description and embodiments of the subject matter disclosed herein relate to methods and systems for a scalable security verification for V2X using a smart dispatcher. A verification logic may be included on a software module of a controller and on a hardware module, separate from the controller. The controller may be a processor or other similar computing device of a vehicle, as shown in FIG. 1. A detailed schematic of the V2X network is shown in FIG. 2.

Figure 3:
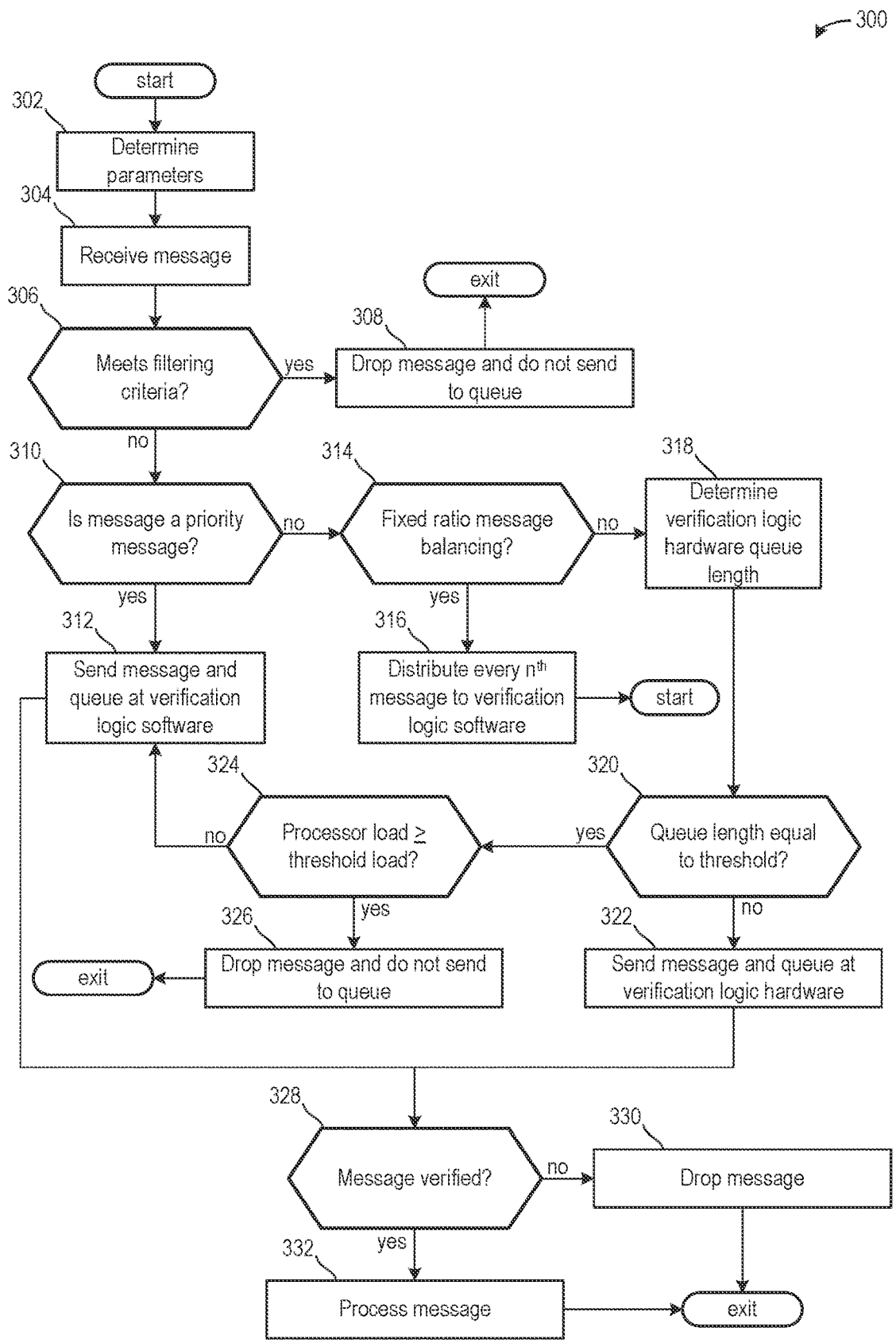
FIG. 3 shows a method for operating a smart dispatcher of the V2X network.

The smart dispatcher may be configured to receive messages from a V2X stack and distribute the messages to the verification logic of the software module or the hardware module based on one or more criterion. In one example, the criterion may include one or more of filtering conditions, load on a system, verification of an engine, a static load balance ratio, and a priority or a type of the message. A method for distributing messages via the smart dispatcher is shown in FIG. 3.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 230 as indicated by arrow 122 while engine 110 is deactivated, which may herein be referred to as an electric-only operation.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162. In some examples, the engine 110 may deactivate during regenerative braking and traction at the drive wheel 130 may be negative, such that the motor 120 may spin in reverse and recharge the energy storage device 150. Thus, regenerative braking may be distinguished from an electric-only operation, where the motor 120 may provide positive traction at the drive wheel 130, thereby decreasing a SOC of the energy storage device 150 while the engine 110 is deactivated.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated, such as during a charge-sustaining operation. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system or a hybrid propulsion. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated by power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in further detail below, motor 120 may be configured to rotate the engine unfueled in a forward (e.g. default orientation) or reverse orientation, using energy provided via energy storage device 150, exemplified by arrow 186.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors. In some examples, increasing the electrical energy supplied from the energy storage device 150 may decrease an electric-only operation range, as will be described in greater detail below.

Control system 190 may communicate with one or more of engine 110, motor 120, fuel system 140, energy storage device 150, and generator 160. In some examples, control system 190 may be used as a controller, a processor, or other computing device. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. In some examples, control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 100 may be configured to operate autonomously (e.g., without a human vehicle operator). As such, the control system 190 may determine one or more desired operating engine conditions based on estimated current driving conditions. In some examples, one or more of the messages communicated may be used during autonomous operation.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnect between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V212V), vehicle-to-infrastructure (V2I), and/or vehicle-to-everything (V2X) technology. The communication and the information exchanged between vehicles can be either directly between vehicles, or can be multi-hop. In some examples, longer range communications (e.g. WiMax) may be used in place of, or in conjunction with, V2V, or V212V, to extend the coverage area by a few miles. In still other examples, vehicle control system 190 may be communicatively coupled to other vehicles or infrastructures via a wireless network 131 and the internet (e.g. cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection. In the examples of FIGS. 2 and 3, the control system 190 and the wireless network 131 are described in greater detail.

The wireless network 131 may include one or more computing systems (e.g., servers) including memory and one or more processors. The memory may be configured to store various anomaly detection/remaining useful life determination models as described herein, as well as various data provided thereto, including vehicle operational/sensor data obtained from multiple vehicles. The processor may execute the instructions stored in memory in order to enter the vehicle operational/sensor data into the various models, adjust AD thresholds based on the output of the models, sort the models, etc., as described below.

Vehicle propulsion system 100 may also include an onboard navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

In some examples, vehicle propulsion system 100 may include one or more onboard cameras 135. Onboard cameras 135 may communicate photos and/or video images to control system 190, for example. Onboard cameras may in some examples be utilized to record images within a predetermined radius of the vehicle, for example. The onboard cameras 135 may be arranged on an exterior surface of the vehicle so that an area surrounding and/or adjacent to the vehicle may be visualized.

Turning now to FIG. 2, it shows a V2X communication network 200 communicatively coupled to the control system 190 via the wireless network 131. In one example, the control system 190 may include a processor 290. The V2X communication network 200 may further include a verification logic hardware 280. In the example of FIG. 2, the processor 290 and the verification logic hardware 280 are programmed onto separate processor hardware. That is to say, the processor 290 and the verification logic hardware 280 may be distinct hardware components of the V2X communication network 200. Components in the V2X communication network 200 may be distal to one another while maintaining communicative coupling.

The processor 290 may include one or more software modules including a V2X stack 212, a smart dispatcher 222, a parameter configuration module 224, and a verification logic software 232. The V2X stack 212 may be configured to send a plurality of messages to the smart dispatcher 222. The messages may correspond to a plurality of vehicle conditions, environmental conditions, and the like. For example, the vehicle conditions may include one or more of a vehicle speed, an engine temperature, an amount of emissions, a throttle position, an EGR flow rate, a coolant temperature, a cabin climate control request, a fuel economy, a fuel quality, and the like. The environmental conditions may include one or more of a local ambient temperature, a humidity, an amount of sun, a wind speed, a wind direction, an amount of traffic congestion, a traffic light timing, an amount of pedestrian traffic, locations of refueling stations and/or recharging stations, an average vehicle speed, an average vehicle stop length, and the like. In one example, the V2X stack 212 may receive feedback from sensors of the vehicle. Additionally or alternatively, the V2X stack 212 may receive a plurality of messages from the wireless network 131.

The smart dispatcher 222 may receive a plurality of messages from the V2X stack 212. The smart dispatcher 222 may be configured to filter the messages and decide where certain types of messages may be verified. Filtering criteria may be set via the parameter configuration module 224 for the smart dispatcher 222 to determine to send messages to either the verification logic software or the verification logic hardware. In one example, a ratio of messages sent to the verification logic software 232 and the verification logic hardware 280 may be a fixed ratio. Additionally or alternatively, filtering criteria may adjust the ratio based on one or more trigger-conditions, which may be executed on a per-message basis as will be described in greater detail below. The filtering criteria may be further set to filter undesired messages, wherein undesired messages are dropped and not verified.

In one example, if a static load balancing of the verification logic software 232 and the verification logic hardware 280 is 1:n, then every $n^{th}$ message may be sent to the software module. In some examples, additionally or alternatively, the verification logic software 232 may receive higher priority messages and the verification logic hardware 280 may receive lower priority messages.

Filtering criteria may include but are not limited to one or more of a load on the processor 290, a load on the verification logic hardware 280, an urgency of the message, a queue length of the verification logic software 232, a queue length of the verification logic hardware 280, a type of message, burst conditions, and proximity.

For example, the type of message may be one of a plurality of types including an emission type, an engine type, a degradation type, a weather type, a traffic congestion type, and the like. Certain types of messages may be prioritized over others. For example, the degradation type may be prioritized over the traffic congestion type. For example, priority messages may include data regarding vehicle events that may be used in diagnostic routines or other routines where degradation of components is mitigated, such as temperature control, power output control, and the like.

As another example, the load on the verification logic software 232 may be based on one or more of the queue length of the verification logic software 232 and/or a processor utilization which may correlate to a number of tasks being executed by the processor 290.

As a further example, a load on the verification logic hardware 280 may be based on the queue length of the verification logic hardware 280 compared to a threshold value. The threshold value may be based on a non-zero positive number. In one example, the threshold value may be based on a computing ability of the verification logic hardware 280.

In some examples, additionally or alternatively, message distribution via the smart dispatcher 222 may be based on a load of the verification logic hardware 280. The verification logic hardware 280 may include a threshold queue size. If a current queue size (e.g., number of queued messages) is less than the threshold queue size, then messages may be sent to the verification logic hardware 280. If the queue size is equal to the threshold queue size and the load on the processor 290 is less than a threshold load, then messages may be forward to the verification logic software 232. If both the queue size is equal to the threshold queue size and the load on the processor 290 is greater than or equal to the threshold load, then the message may be dropped. By doing this, denial of service (DOS) attacks may be thwarted.

As an additional example, the burst conditions may be derived from chipset statistics. For example, burst conditions may include where a higher than average number of messages are being broadcast to and from the processor 290. In one example, burst conditions may occur in cities or other population dense areas with vehicles in close-proximity to one another.

As a further example, the proximity may be based on an approximation based on a signal strength indicator from the chipset. Additionally or alternatively, the proximity may be based on a location from which the message is sent. For example, if a first vehicle broadcasts a message received by a second vehicle and a third vehicle, the second vehicle closer to the first vehicle than the third vehicle, then a prioritization of the message may be higher in the second vehicle than in the third vehicle.

Messages sent to the verification logic software 232 may enter a first queue 234. Messages in the first queue 234 may be verified in the order in which they are received, which may be tracked via a timestamp or the like. Messages sent to the verification logic hardware 280 may enter a second queue 284 prior to being verified by a verification logic module 282. Messages in the second queue 284 may be verified in the order in which they are received, which may be tracked via a timestamp or the like. Messages in the first queue 234 may be separate from messages in the second queue 284. Additionally or alternatively, messages in the first queue 234 may be verified independently of a verification of messages in the second queue 284.

Verification via the verification logic software 232 and the verification logic module 282 may include reviewing certificates, signatures, and other identifying factors of a message. As described above, the verification may include verifying the signature over the message to monitor if the contents of the message were altered following its signing. Messages that do not pass the verification process may be discarded. Messages that pass the verification process may be utilized in one or more processes of the vehicle and/or other vehicles in communication with the wireless network.

Thus, in one example, FIG. 2 illustrates an example of a verification software and hardware configured to expand a capacity of a wireless network. In previous examples, such as in the prior art described above, the verification logic hardware 280 may include a fixed capacity based on a number of verifications processed per unit-time-interval, which may be predetermined based on maximum load conditions. When the load of the verification logic hardware 280 reaches a maximum load, latency and turnaround times may increase due to queueing delays. Prioritized messages may then be dropped, which may reduce an effectiveness of the V2X system. Overprovisioning a capacity of the verification logic hardware 280 to handle burst conditions may result in increased costs and reduced overall utilization, resulting in a cost-ineffective solution.

In the example of the embodiment of FIG. 2, the V2X system is enhanced. The software module (e.g., verification logic software 232) may expand a number of V2X messages verified per second beyond the capacity of the verification logic hardware 280 by utilizing an available capacity of the processor 290. This may result in fewer prioritized messages being dropped or delayed. Additionally, hardware-queue latencies for prioritized messages under higher loads or burst conditions may be minimized. Overprovisioning hardware may be omitted, reducing a cost of the V2X system of the present disclosure relative to other systems using a greater amount of hardware or additional computer power to overprovision for burst conditions. The filtering criteria of the parameter configuration module 224 may reduce an effective load on the verification logic hardware 280 and protect against DOS attacks.

Turning now to FIG. 3, it shows a method 300 illustrating a message distribution to the verification logic hardware or the verification logic software at the smart dispatcher. Instructions for carrying out method 300 may be executed by a processor based on instructions stored on a memory of the processor and in conjunction with signals received from sensors of the engine system and the V2X system, such as the sensors described above with reference to FIG. 1.

At 302, the method 300 may include determining parameters. The parameters may include one or more filtering criteria, such as a desired message distribution ratio, desired queue thresholds for the verification logic software and the verification logic hardware, a threshold load for the processor, message type priority filters, and the like. As described above, the verification logic software may be included in a processor of a vehicle and the verification logic hardware may be included in roadside unit (RSU) or other portion of the V2X system outside of the vehicle.

At 304, the method 300 may include receiving a message. The message may be sent by a wireless network, a different vehicle, a sensor of the vehicle, or the like. In one example, the received message is sent from a V2X stack of the vehicle to the smart dispatcher.

At 306, the method 300 may include determining if the message meets filtering criteria. The filtering criteria may include distance-based filtering, in which, the message may be dropped if the sender is more than a threshold distance from the receiver. The threshold distance may be equal to 1000 meters, 2500 meters, 5000 meters, or more. Additionally or alternatively, the filtering criteria may be based on sender information and detection of a malicious send-pattern. The filtering criteria may further include filtering corrupt or incomplete messages. If the message meets the filtering criteria, then at 308, the method 300 may include dropping the message. The dropped message may not be sent to a queue of either the verification logic software or the verification logic hardware.

If the message does not meet the filtering criteria, then at 310, the method 300 may include determining if a message type of the message is a priority message. In one example, the message type of each message received may be determined. Priority messages may include data regarding engine events, diagnostic events, and the like. Additionally or alternatively, priority messages may be based on a proximity to the vehicle. For example, if a different vehicle within a threshold distance of the vehicle sends a message, then the message may be a priority message. The threshold distance may be based on a non-zero, positive number. The threshold distance may be equal to 50 meters (m), 25 m, 10 m, or so on. Additionally or alternatively, the threshold distance may correspond to a geofenced area, wherein messages shared between vehicles in the geofenced area may be prioritized relative to messages shared between vehicles in different geofenced areas. The geofenced area may include one or more of a city, a stadium, a park, a school, a landmark, a parking lot, a retail store, and the like.

If the message is a priority message, then at 312, the method 300 may include sending and queueing the message at the first queue of the verification logic software. The smart dispatcher may send the message to the verification logic software. In one example, the message may be verified in the order in which it is received. In another example, depending on a prioritization of the message, the message may be verified prior to other messages already queued in the first queue of the verification logic software. In this way, a magnitude of prioritization may be assigned to each message. In some examples, priority messages may be sent to the verification logic hardware is a load of the processor is greater than or equal to a threshold load, as will be described in greater detail below.

If the message is not a priority message, then at 314, the method 300 may include determining if fixed ratio message balancing is desired. Fixed ratio message balancing may be desired when a load of the verification logic hardware is relatively low, a low number of messages is being transmitted (e.g., not burst conditions), and the like. If fixed ratio message balancing is desired, then at 316, the method 300 may include distributing every $n^{th}$ message to the verification logic software. For example, if n is equal to 4, then every fourth message may be sent to the verification logic software and the three messages therebetween are sent to the verification logic hardware.

If fixed ratio message balancing is not desired, then at 318, the method 300 may include determining a verification logic hardware queue length. The queue length of the verification logic hardware may be equal to a number of messages queued to be verified by the verification logic hardware.

At 320, the method 300 may include determining if the queue length is equal to a threshold queue length. The threshold queue length may be based on a maximum processing capacity of the verification logic hardware, wherein queues longer than the threshold queue length may result in increased latency and turnaround times. The threshold queue length may be based on a non-zero, positive number, in one example.

If the queue length is not equal to and is less than the threshold queue length, then at 322, the method 300 may include sending and queueing the message at the verification logic hardware. In one example, the smart dispatcher sends the messages to the verification logic hardware. The message may be queued in the order in which it is received. For example, the message may be in a last position of the queue. Additionally or alternatively, the message may be queued based on message type. For example, messages received internally may be queued separately from messages received from other vehicles or the wireless network. Additionally or alternatively, messages may be queued based on message type.

If the queue length is equal to the threshold queue length, then at 324, the method 300 may include determining if a processor load is greater than or equal to a threshold load. The threshold load may be based on a load below a maximum load, wherein a difference between the threshold load and the maximum load may be unused for message verification in order to complete other tasks, such as onboard vehicle tasks.

If the processor load is greater than or equal to the threshold load, then at 326, the method 300 may include dropping the message and not sending the message to be queued at either of the verification logic software or the verification logic hardware. Dropping the message may include removing the message from the smart dispatcher. The dropped message does not get verified.

If the processor load is not greater than or equal to the threshold load, then the method 300 may include sending and queuing the message at the verification logic software, as described above at 312. The message may be sent to the verification logic software due to a processing capacity of the processor still being available. By doing this, a scalability and a headroom capacity of the V2X system is increased.

Following 312 and 322, the method 300 may proceed to 328, which includes determining if the message is verified. Verifying the message may include reviewing a sender's certificate and determining the sender's certificate is signed by a trusted certificate authority. The verification may further include verifying a signature over the message to determine if contents of the message were altered following its signing.

If the message does not pass verification, then at 330, the method 300 may include dropping the message. Dropping the message may include removing the message from the verification logic software or the verification logic hardware. In some example, a sender of the message may be flagged. By doing this, future messages received from the sender may be tagged, wherein successive messages from the sender not passing verification may result in blocking the sender and/or notifying the sender of the messages not passing verification. Operating conditions may not be adjusted based on the dropped message.

If the message does pass verification, then at 332, the method 300 may include processing the message. Processing the message may include analyzing a content of the message and adjusting one or more operating conditions if desired. For example, if the message included content related to a proximity with another vehicle, then operating conditions may be adjusted to increase a gap between the vehicles. As another example, if the message included content related to a traffic light stop duration, then start/stop conditions may be adjusted based on the traffic light stop duration. As a further example, if the message included content related to emissions, then operating parameters may be adjusted to increase or decrease emissions.

As used herein, an element or step recited in the singular and preceded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "that includes," "including," or "having" an element or a plurality of elements having a particular property may include additional such elements not having that property. The terms "including" and "in which" are used as the plain-language equivalents of the respective terms "that includes" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method executed by a processor of a vehicle based on instructions stored on non-transitory memory thereof, the method, comprising:
    determining a message type of a message based on one or more of a content of the message and a proximity of the message to the vehicle;
    sending priority messages to a verification logic software of the processor; and
    sending non-priority messages to either the verification logic software or a verification logic hardware based on a load of the processor and a queue length of the verification logic hardware, wherein the verification logic hardware is arranged in a roadside unit outside of the vehicle;
    wherein sending non-priority messages to the verification logic software occurs in response to the queue length being equal to a threshold queue length and the load being less than a threshold load, wherein the threshold load is based on a maximum computer capacity of the processor.

2. The method of claim 1, wherein sending non-priority messages to the verification logic hardware occurs in response to the queue length being less than the threshold queue length, wherein the threshold queue length is based on a processing capacity of the verification logic hardware.

3. The method of claim 2, further comprising dropping non priority messages in response to the queue length being equal to the threshold queue length and the load being greater than or equal to the threshold load.

4. The method of claim 3, wherein dropping non-priority messages comprises not sending dropped non-priority messages to the verification logic software or the verification logic hardware.

5. The method of claim 1, further comprising verifying messages in a queue of the verification logic software via the verification logic software and verifying messages in a queue of the verification logic hardware via the verification logic hardware.

* * * * *